US008875237B2

(12) United States Patent
Engdahl et al.

(10) Patent No.: US 8,875,237 B2
(45) Date of Patent: Oct. 28, 2014

(54) PRIVATE NETWORK ACCESS USING IPV6 TUNNELING

(75) Inventors: Christopher J. Engdahl, Seattle, WA (US); Jeromy Statia, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1754 days.

(21) Appl. No.: 11/981,105

(22) Filed: Oct. 31, 2007

(65) Prior Publication Data

US 2009/0113521 A1   Apr. 30, 2009

(51) Int. Cl.
| H04L 9/32 | (2006.01) |
| H04L 12/28 | (2006.01) |
| H04L 29/06 | (2006.01) |
| H04L 29/12 | (2006.01) |

(52) U.S. Cl.
CPC .............. *H04L 63/10* (2013.01); *H04L 63/164* (2013.01); *H04L 61/1511* (2013.01); *H04L 29/12066* (2013.01); *H04L 63/08* (2013.01); *H04L 63/0272* (2013.01)
USPC ............................................. 726/3; 370/254

(58) Field of Classification Search
None
See application file for complete search history.

(56) References Cited

U.S. PATENT DOCUMENTS

| 7,031,328 | B2 * | 4/2006 | Thubert et al. ................ 370/401 |
| 7,228,131 | B2 * | 6/2007 | Yokota et al. .............. 455/426.1 |
| 7,305,481 | B2 * | 12/2007 | Blanchet et al. ............. 709/230 |
| 7,437,470 | B2 * | 10/2008 | Fernandes et al. ............ 709/230 |
| 7,746,891 | B2 * | 6/2010 | Yamamoto et al. ........... 370/466 |
| 7,810,149 | B2 * | 10/2010 | Islam et al. ..................... 726/11 |
| 2004/0073642 | A1 * | 4/2004 | Iyer ............................... 709/223 |
| 2004/0088385 | A1 * | 5/2004 | Blanchet et al. ............. 709/220 |
| 2004/0133692 | A1 | 7/2004 | Blanchet et al. |
| 2004/0264465 | A1 | 12/2004 | Dunk |
| 2004/0264474 | A1 | 12/2004 | Sbida |
| 2005/0005014 | A1 | 1/2005 | Holmes et al. |
| 2005/0138166 | A1 | 6/2005 | Blanchet |
| 2006/0215657 | A1 * | 9/2006 | Lee et al. ..................... 370/389 |
| 2007/0025309 | A1 | 2/2007 | Yano et al. |
| 2007/0050613 | A1 * | 3/2007 | Islam et al. .................. 713/150 |
| 2007/0177550 | A1 | 8/2007 | Kwon et al. |
| 2007/0189219 | A1 | 8/2007 | Navali et al. |
| 2008/0192758 | A1 * | 8/2008 | Mahkonen .................... 370/401 |
| 2009/0158416 | A1 * | 6/2009 | Statia ............................. 726/12 |

FOREIGN PATENT DOCUMENTS

| EP | 1763197 A2 | 3/2007 |
| WO | 2005/025141 A1 | 3/2005 |
| WO | 2006129136 A1 | 12/2006 |

OTHER PUBLICATIONS

Gilligan e al. RFC 4213 "Basic Transition Mechanisms for IPv6 Hosts and Routers," Oct. 2005.*

(Continued)

*Primary Examiner* — Kaveh Abrishamkar
(74) *Attorney, Agent, or Firm* — Henry Gabryjelski; Kate Drakos; Micky Minhas

(57) ABSTRACT

A connection to a private network may use an IPv6 tunneling client to connect to a corresponding IPv6 tunneling router at the edge of the private network. The client may be configured to automatically establish a tunneling connection and may have a routing table for routing IPv6 addresses for hosts within the private network through the tunneling connection. The client may be connected to an IPv4 or IPv6 connection outside the private network. The connection between the IPv6 tunneling client and IPv6 tunneling router may be an authenticated and secure connection.

20 Claims, 5 Drawing Sheets

400
METHOD FOR CONNECTING BETWEEN CLIENT AND IPv6 TUNNELING ROUTER

(56) References Cited

OTHER PUBLICATIONS

International Search Report and Written Opinion Received for PCT Application No. PCT/US2008/081130, mailed on May 18, 2009, 11 pages.

Arkko, J, RFC 4866—Enhanced Route Optimization for Mobile IPv6, Request for Comment, May 2007.

"Using IPsec to Secure IPv6-in-IPv4 Tunnels", Published on: May 2007, 22 pages, Available at: http://www.rfc-editor.org/rfc/rfc4891.txt.

"The Teredo Protocol: Tunneling Past Network Security and Other Security Implications", Published on: Nov. 28, 2006, 53 pages, Available at: http://www.symantec.com/avcenter/reference/Teredo_Security.pdf.

"Teredo: Tunneling IPv6 over UDP through Network Address Translations (NATs)", Published on: Feb. 2006, 26 pages, Available at: http://tools.ietf.org/html/rfc4380.

Bi, Jun et al., "IPv4/IPv6 Transition Technologies and Univer6 Architecture", IJCSNS International Journal of Computer Science and Network Security, vol. 7, Jan. 2007, 12 pages, Available at: http://paper.ijcsns.org/07_book/200701/200701B06.pdf.

* cited by examiner

PRIVATE NETWORK ACCESS USING IPV6 TUNNELING

BACKGROUND

Access to private networks, by definition, may be difficult to establish from outside the private network. A private network may be a network that has a gateway, firewall, or has other mechanisms in place so that general users of the Internet may not be able to access hosts on the private network. An example of a private network may be an intranet used within a person's home, company, or other organization.

One technique for accessing a private network may be a Virtual Private Network (VPN) connection. In a VPN, a client may connect to the private network from outside the network and operate as if the client were connected inside the network. For example, once a VPN connection is established, any communication with the general Internet may be routed through a gateway on the private network and may be limited or restricted by the gateway.

Some VPN connections may be configured for split tunneling, where a client may be able to connect to a private network as well as connect to other Internet connections without going through the VPN connection. In some such situations, the private network may be exposed to various security vulnerabilities, and split tunneling is often discouraged.

SUMMARY

A connection to a private network may use an IPv6 tunneling client to connect to a corresponding IPv6 tunneling router at the edge of the private network. The client may be configured to automatically establish a tunneling connection and may have a routing table for routing IPv6 addresses for hosts within the private network through the tunneling connection. The client may be connected to an IPv4 or IPv6 connection outside the private network. The connection between the IPv6 tunneling client and IPv6 tunneling router may be an authenticated and secure connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
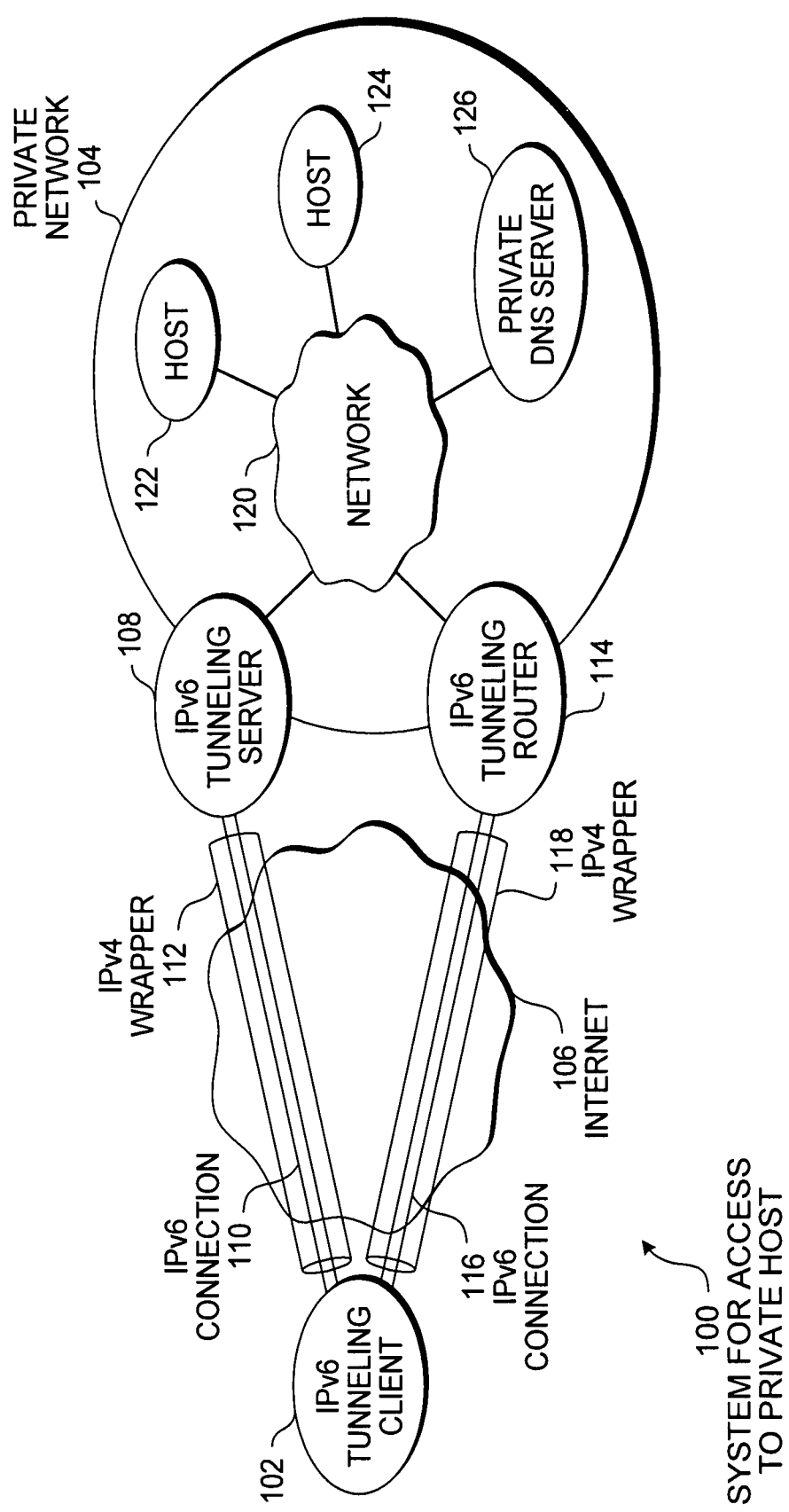
FIG. 1 is a diagram illustration of an embodiment showing a system with access to a private network using an IPv6 tunnel.

An IPv6 tunneling router located on the edge of a private network may be used to gain authenticated and secure access to the private network by a corresponding IPv6 tunneling client located outside the private network. The client may be connected to the Internet using either an IPv4 or IPv6 connection.

The client device may be equipped with an IPv6 tunneling client adapted to establish a connection to the IPv6 tunneling router and may also be equipped with a routing table that may be populated with addresses for hosts within the private network. When a request is received to connect to a host within the private network, the connection may be made using the IPv6 tunneling client connecting to the IPv6 tunneling router and a connection may be established with the host.

The connection between the IPv6 tunneling client and IPv6 tunneling router may be a secure connection. Such a connection may have authentication of the client to the router and the router to the client. Such a connection may use various encryption technologies so that the contents of messages passed from the client to the router are encrypted. One embodiment may use Internet Protocol Security (IPsec) on an IPv4 connection between the client and router.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a network with an IPv6 tunneling connection. Embodiment 100 is a simplified example used to highlight various characteristics, features, and uses of an IPv6 tunneling client and IPv6 tunneling router to give secure access to IPv6 tunneling client into a private network.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described. When a functional element is embodied in a software component, the software component may be viewed as a mechanism by which the behavior and functionality of a physical hardware device.

Embodiment 100 is illustrates how an IPv6 tunneling system may be used to gain access to a private network 104 from a client 102 with access to the Internet 106. The IPv6 tunneling system may create one or more IPv6 communication paths through which communications into the private network 104 may pass. In some embodiments, the connection to the private network 104 may include various security mechanisms, including authentication and encryption.

A common use model may be a laptop or other portable computer used to connect to a corporate network by an employee of the corporation. The employee's device may contain an IPv6 tunneling client 102. The employee may be located at an airport, hotel room, or coffee shop and may establish a connection with the Internet 106. Once connected to the Internet, IPv6 tunneling mechanisms may be used to establish an authenticated and secure connection to hosts 122 and 124 within the private network 104, while still enabling access to other Internet sites. In some cases, the connection to the Internet 106 may be using IPv4 while in other cases, the connection may use IPv6.

IPv4 may refer to the Internet Protocol version 4, which is described in IETF RFC 791 and US MIL-STD-1777. IPv6 may refer to the Internet Protocol version 6, which is the successor to IPv4.

The IPv6 tunneling client may use any type of tunneling mechanism that may enable IPv6 traffic to be transferred over IPv4 portions of a network. Some IPv6 tunneling mechanisms may include Teredo, Intra-Site Automatic Tunneling Addressing Protocol (ISATAP), and 6 to 4 tunneling. Some tunneling mechanisms may be better suited than others for use in embodiment 100, and other tunneling mechanisms may be developed for use in applications such as embodiment 100.

The IPv6 tunneling client 102 may establish a connection with an IPv6 tunneling server 108 by encapsulating an IPv6 connection 110 within an IPv4 wrapper 112. Tunneling, as referred to in this specification and claims, is any mechanism by which an IPv4 technologies may be used to carry an IPv6 payload. In either end of the IPv4 wrapper 112, the IPv6 payload may be unwrapped and forwarded as IPv6 traffic.

The IPv6 tunneling client 102 may be a function of a client device. The client device may be any type of network connected device, such as a laptop computer, a desktop computer, a mobile device such as a handheld personal digital assistant (PDA) or cellular telephone, a remote server, or any other device connected to the Internet 106.

The IPv6 tunneling server 108 may be used to establish a connection with the IPv6 tunneling client 102 and direct the client to an IPv6 tunneling router 114. The IPv6 tunneling router 114 may be the mechanism by which network traffic may be received into the private network 104, unwrapped from IPv4 format, and passed into the network 120 as IPv6 traffic to one of the hosts 122 or 124.

In some IPv6 tunneling technologies, such as Teredo, an IPv6 tunneling server 108 may be used to assist in the address configuration of the IPv6 tunneling client 102 and facilitate initial communication between the IPv6 tunneling client 102 and various hosts. In many embodiments, the IPv6 tunneling server 108 may be used to facilitate a connection between the IPv6 tunneling client 102 and the IPv6 tunneling router 114.

The IPv6 tunneling router 114 may be used to bridge communication between an IPv6 network 120 and an IPv4 portion of the Internet 106. The IPv6 tunneling router 114 may be located on the edge of the private network 104 at a gateway or other connection between the network 120 and the Internet 106. In some embodiments, the IPv6 tunneling server 108 may or may not be located on an edge or gateway to the private network 104. In some cases, the IPv6 tunneling server 108 may be located outside the private network 104 and within the Internet 106.

In many embodiments, the IPv6 tunneling server 108 and IPv6 tunneling router 114 may be incorporated into a single device. In some embodiments, the functions of a server and router may be indistinguishable, while other IPv6 technologies may have expressly separate functions associated with a server and router.

The IPv6 tunneling client 102 may connect to the IPv6 tunneling router 114 and may provide access to various hosts 122 and 124 within the private network 104. In some embodiments, a private DNS server 126 may be accessed through the connection facilitated by the IPv6 tunneling router 114.

The IPv4 wrappers 112 and 118 may be established using various security mechanisms. Some embodiments may use an authentication mechanism to authenticate the IPv6 tunneling client 102 to the IPv6 tunneling router 114 or IPv6 tunneling server, and some embodiments may use an authentication mechanism to verify the router or server to the client. Such authentication mechanisms may enable a trusted communication path between the devices to be established.

In some cases, authentication mechanisms may be used to thwart 'man in the middle' security attacks where a communication session may be redirected from an intended connection point or host to a malicious host. By authenticating the server or router to the client, the client may be assured that the connection is proper.

Authentication of the client to the server or router may be used to ensure that connections are established with trusted clients. A private network for a company may wish to allow employees to have access but may wish to prevent other users from having access. By authenticating each client, a server may permit or deny access to unauthenticated clients or to clients for which a previous relationship has not been established.

Some embodiments may use encryption of the IPv4 packets or IPv6 payload to prevent eavesdropping or other security breach. When an encryption mechanism is used for the IPv4 packets, an interloper may not be able to determine the contents of the IPv6 packets. In some cases, an encryption mechanism may be used on IPv6 packets within the IPv4 packets, which may provide some encryption of the underlying data but may make the header or other IPv6 information unencrypted.

Many encryption technologies may be used for securing transmissions between an IPv6 tunneling client 102 and an IPv6 tunneling router 114 or server 108. Some embodiments may use Internet Protocol Security (IPsec) which is a Layer 3 security mechanism. Other embodiments may use Secure Sockets Layer (SSL) or other security mechanisms.

Many embodiments may enable the IPv6 tunneling client to access various hosts 122 and 124 within the private network 104 while also enabling access to other hosts connected through the Internet 106. One embodiment may use a routing table or other predefined lists of addresses for the hosts 122 and 124. The routing table may include entries for the hosts 122 and 124 and may specify that connections to those hosts may use an IPv6 tunneling connection.

The routing table may be consulted during the process of establishing a connection to a host. During such a process, a connection engine may receive an address and attempt to establish a connection with a host at the address. The address may be provided by a DNS server, application, or some other source and may be part of a set of addresses for a particular host. In some cases, two or more addresses may be provided, including addresses in IPv4 and IPv6 domains. The connection engine may sort the addresses and lookup the addresses in the routing table. For hosts 122 and 124, an entry in the routing table may indicate that a connection is to be established through the IPv6 tunneling router 114. For other hosts, a connection may be made through the Internet 106 or some other mechanism.

In some embodiments, a private DNS server 126 may be accessed by an IPv6 tunneling client 102 to resolve hostnames. A hostname may be a text based or common name for a host, and a DNS server may receive a hostname and return one or more addresses that correspond with the hostname. Some embodiments may configure the IPv6 tunneling client 102 to use the private DNS server 126 as a DNS server for resolving hostnames. In some such cases, the private DNS server 126 may be queried along with other DNS servers outside of the private network 104 to determine an address for a hostname.

The private DNS server 126 may be used to resolve hostnames for hosts located within the private network 104. In some embodiments, the private DNS server 126 may be queried to determine an address for a host 122 which may be within a range of addresses located in a routing table. The routing table may be set up so that any address within a range may be routed through the IPv6 tunneling router 114 and may be located within the private network 104. Such an embodiment may allow a user to access various devices using hostnames within the private network 104 without having to have an updated list of each device address within the private network 104.

The private network 104 may contain many hosts 122 and 124. In many cases, the network 120 and the various devices attached to the network 120 may operate using IPv6 addressing. Some embodiments may have portions of the network 120 operable on IPv6 as well as IPv4.

The IPv6 tunneling router 114 may be located on an edge of the private network 104. An edge connection may be any connection between the Internet 106 or other wide area network and the private network 104. In many cases, the IPv6 tunneling router 114 may be located between a network 120 that operates on IPv6 and an Internet connection that operates on IPv4. The IPv6 tunneling router 114 may accept both IPv4 or IPv6 addresses from communications originating within the network 120 and forward the communications into the Internet 106. In some cases, the IPv6 tunneling router 114 may establish connections between IPv6 hosts within the private network 104 and other IPv6 tunneling clients 102 or other IPv6 tunneling routers.

Each embodiment may be configured in different manners. In some embodiments, a connection to the Internet 106 may pass through a modem, a gateway device, a firewall, or some other device or combination of devices before the IPv6 tunneling router 114 and the network 120. In some embodiments, various gateways, firewalls, or other devices may be located between the IPv6 tunneling router 114 and the network 120.

Figure 2:
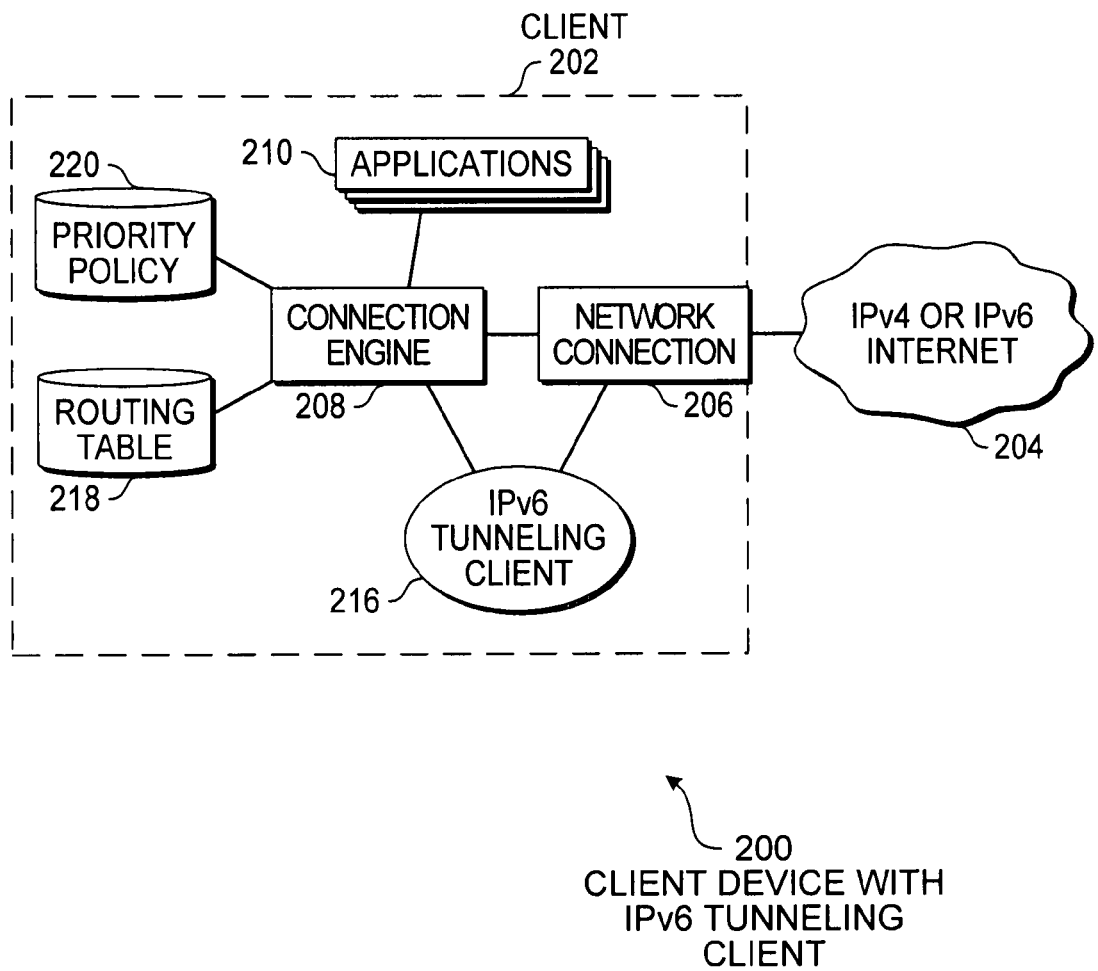
FIG. 2 is a diagram illustration of an embodiment showing a client device with an IPv6 tunneling client.

FIG. 2 is a diagram illustration of an embodiment 200 showing a client device with an IPv6 tunneling client. Embodiment 200 is a simplified example of a client device and is used to show functional elements that may make up a client device that may connect to a private network using an IPv6 tunneling mechanism.

The diagram of FIG. 2 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described. When a functional element is embodied in a software component, the software component may be viewed as a mechanism by which the behavior and functionality of a physical hardware device.

The client 202 may be any type of device that may be connected to the Internet 204. In many cases, a client 202 may be a laptop, mobile computing device, desktop computer, or other device that may be used to access a private network. A network connection 206 may connect to the Internet 204 using IPv4 or IPv6 technologies.

A connection engine 208 may take connection requests from various applications 210 and establish connections between the applications 210 and other hosts. The connection engine 208 may use various other components, including an IPv6 tunneling client 216, to establish and operate such connections.

The applications 210 may be any type of application, function, or service that is performed by the client 202 and may connect to the Internet 204. A common application that connects to the Internet 204 may be a web browser, but other applications may connect to various file systems, databases, remotely hosted services, or other applications or functions provided by other hosts.

The client 202 may establish connectivity to the Internet 204 by making connection to a local area network, determining an address for the client 202 on the local area network, and establishing various network routing parameters to connect with the Internet 204. In some cases, an address for the client 202 may be predefined within the client 202 or may be provided by a server available through the network connection 206.

When an initial connection to a network is established and a routing mechanism is available to connect to the Internet 204, the IPv6 tunneling client 216 may be configured to connect to a corresponding IPv6 tunneling server and/or an IPv6 tunneling router located on the edge of a private network and may provide connections into the private network. The IPv6 tunneling client 216 may be configured to establish a connection to a private network when the client 202 connects to the Internet 204 so that the connection engine 208 may quickly route communications to the private network when called upon.

In some embodiments, the IPv6 tunneling client 216 may be automatically activated to connect to a specific IPv6 tunneling router when a connection to the Internet 204 is established. Some embodiments may be configured so that a user may select the connection and cause the connection to be established. The IPv6 tunneling client 216 may be configured with an address for a specific IPv6 tunneling server/router. In many cases, such a configuration may include an IPv4 address for an IPv6 tunneling server or router.

The connection engine 208 may receive a connection request that contains an address or set of addresses for a specific host. In some cases, the connection engine 208 may receive several addresses that may be a mix of IPv4 and IPv6 addresses. A priority policy 220 may be defined that determines an order in which to attempt to connect to the various addresses. When the priority policy 220 is configured to try IPv6 addresses first, the connection engine 208 may attempt a connection that may be processed through the IPv6 tunneling client 216 before attempting an IPv4 connection that may go through the Internet 204.

As each address is evaluated by the connection engine 208 in order of the priority defined by the priority policy 220, the address may be looked up in the routing table 218. The routing table 218 may contain individual addresses or ranges of addresses that may be processed through the IPv6 tunneling client 216 to a private network. The connection engine 208 may compare an address with the routing table 218, find an entry in the routing table for the address, and process the connection through the IPv6 tunneling client 216 to the private network.

In many embodiments, an application may request a connection to a host at a specific address or may provide a hostname without an address. When a hostname is provided by an application, the connection engine 208 may attempt to resolve an address for the hostname using DNS or some other service. In some cases, two or more DNS servers may be available and may be used in a predefined sequence. For many embodiments, one or more private DNS servers may be located within a private network and accessible using the IPv6 tunneling client 216, and such private DNS servers may be included in a group of DNS servers that may be queried for an address of a given hostname.

By including a DNS server located within a private network, a connection engine 208 may be able to resolve many different hostname addresses within the private network. This capability may enable a user to have simple access to hosts within the private network with the same ease as if the client 202 were connected within the private network.

Figure 3:
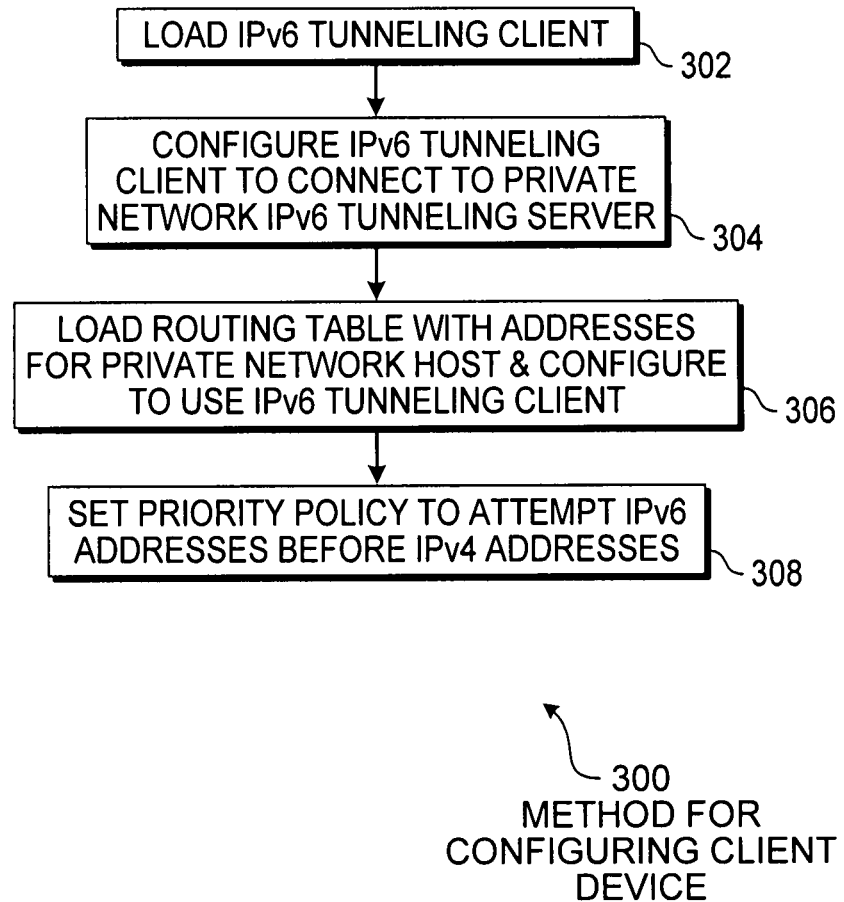
FIG. 3 is a flowchart illustration of an embodiment showing a method for configuring a client device.

FIG. 3 is a flowchart illustration of an embodiment 300 showing a method for configuring a client device. Embodiment 300 is a simplified example of the steps that may be used to configure a client device so that when the client device connects to the Internet, the client may be able to use IPv6 tunneling techniques to access a private network. Other embodiments may use different terminology or nomenclature and may include additional steps or may combine two or more steps into a single step. In other embodiments, some steps illustrated as serial may be performed in parallel and vice versa.

A client device may be configured to use IPv6 tunneling technologies to connection with a private network that has an IPv6 tunneling router on a gateway to the private network. A client device may be configured by first installing an IPv6 tunneling client in block 302. The IPv6 tunneling client may any type of IPv6 tunneling client that may interact with the IPv6 tunneling router located on the gateway of the private network. In some cases, two or more different IPv6 tunneling clients may be used to connect to a single IPv6 tunneling router, with different IPv6 tunneling clients being used for different applications or for different devices or types of devices. In some cases, two or more IPv6 tunneling routers may be accessed by a single IPv6 tunneling client.

The IPv6 tunneling client may be configured to connect to the IPv6 tunneling server in block 304. The configuration of block 304 may include loading an address of the IPv6 tunneling server into the client and configuring the client to connect to the specific IPv6 tunneling server. In some embodiments, various authentication mechanisms, passwords, encryption keys, hardware security devices, or other security or authentication mechanisms may be installed on the client device.

The IPv6 tunneling client may be configured with an address for a specific IPv6 tunneling server in block 304. The address may be an IPv4 address that may be used when the client is able to connect to the Internet using IPv4. Such an address may be used to find the IPv6 tunneling server and establish further communications with an IPv6 tunneling router. In some embodiments, the IPv6 tunneling server and IPv6 tunneling router may be the same devices.

In some embodiments, an IPv6 address for the IPv6 tunneling server may also be included in the configuration of block 304. The IPv6 address may be used to also establish an authenticated and secure communication with an IPv6 tunneling router.

A routing table may be populated with addresses for hosts within the private network. The entries in the routing table for hosts in the private network may indicate that the connection may be made through the IPv6 tunneling client. With such a designation, a connection engine may be able to route the connection appropriately.

In block 308, the priority policy within the client may be configured to attempt IPv6 addresses before IPv4 addresses. In some embodiments, such a selection may be used to override, modify, or select various elements of address selection defaults for IPv6 as defined in RFC 3484 or similar specifications.

Figure 4:
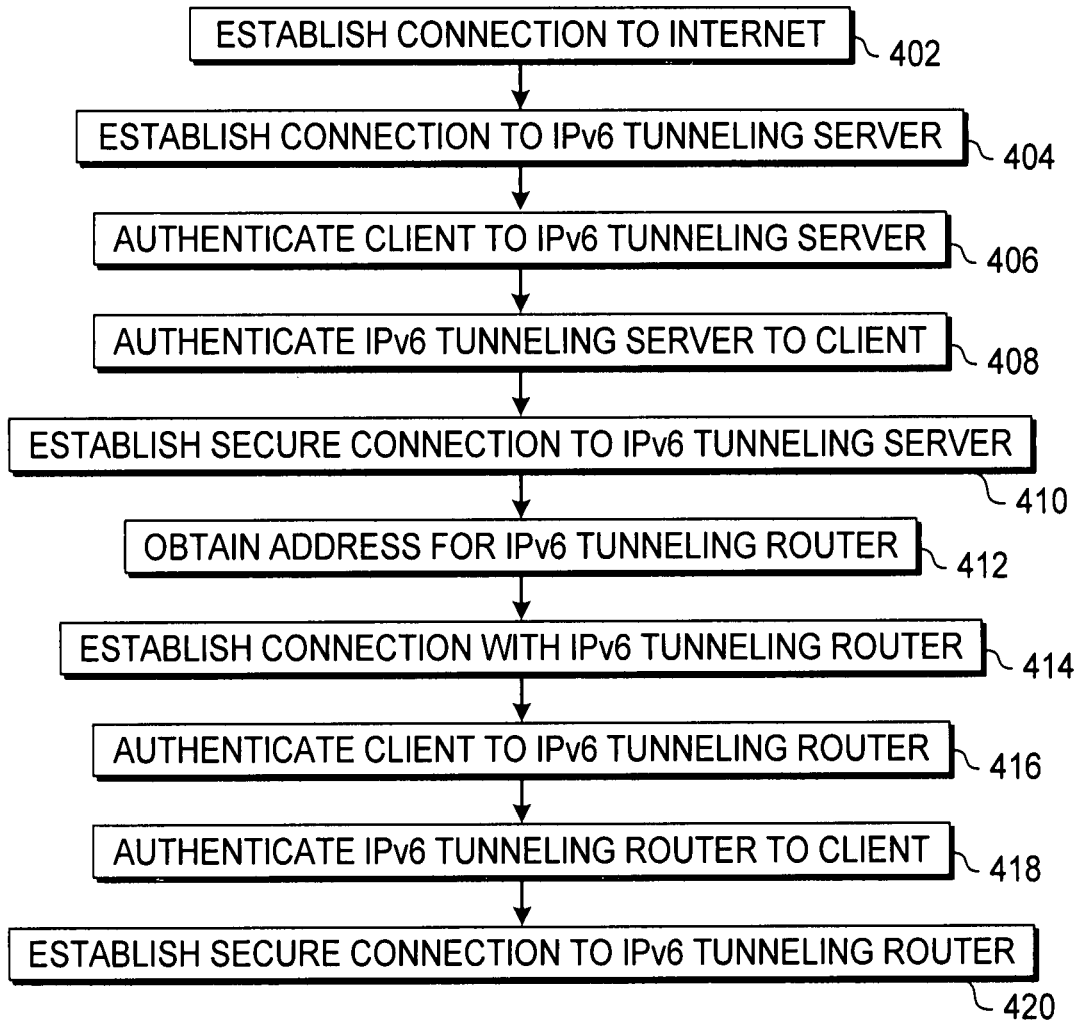
FIG. 4 is a flowchart illustration of an embodiment showing a method for connecting between a client and an IPv6 tunneling router.

FIG. 4 is a flowchart illustration of an embodiment 400 showing a method for connecting between a client and an IPv6 tunneling router. Embodiment 400 is a simplified example of one method for establishing a connection between a client device and an IPv6 tunneling router. Other embodiments may use different terminology or nomenclature and may include additional steps or may combine two or more steps into a single step. In other embodiments, some steps illustrated as serial may be performed in parallel and vice versa.

Embodiment 400 illustrates the steps that may be performed to connect an IPv6 tunneling client to an IPv6 tunneling router, using authentication and secure connections. A first connection is made to an IPv6 tunneling server, an address is obtained for an IPv6 tunneling router, then connection is made to the IPv6 tunneling router.

The client may establish a connection to the Internet in block 402 and establish connection to an IPv6 tunneling server in block 404. In many embodiments, the client may have a predefined address or hostname for the IPv6 tunneling server to facilitate the connection in block 404. In many cases, the connection in block 404 may be an IPv4 connection.

In some embodiments, a connection may be established by attempting several different IPv6 tunneling servers. For example, a set of two or more addresses may be provided on the client to attempt a connection. If a first address fails, another may be attempted until a successful connection is established.

The client may authenticate itself to the IPv6 tunneling server in block 406. In some embodiments, an IPv6 tunneling server may have a list or database of client devices with which the IPv6 tunneling server may communicate. If the client is not on the list, the client may be denied further access.

The IPv6 tunneling server may authenticate itself to the client in block 408. In some embodiments, this authentication may give the client assurance that the server is the intended server and that a connection has not been maliciously redirected to another server.

A secure connection may be established between the client and server in block 410. In some embodiments, a secure protocol such as IPsec may be use for authentication and encryption of a communication session.

An address for an IPv6 tunneling router may be obtained from the IPv6 tunneling server in block 412. In some embodiments, two or more addresses for an IPv6 tunneling router may be obtained. If a failure occurs with one address, another address may be attempted until a successful connection is achieved.

The process for establishing a connection with the IPv6 tunneling router may be similar to the connection with the IPv6 tunneling server.

A connection may be established in block 414 and the client may be authenticated to the IPv6 tunneling router in block 416. The IPv6 tunneling router may be authenticated to the client in block 418 and a secure connection between the client and IPv6 tunneling router may be established in block 420.

Figure 5:
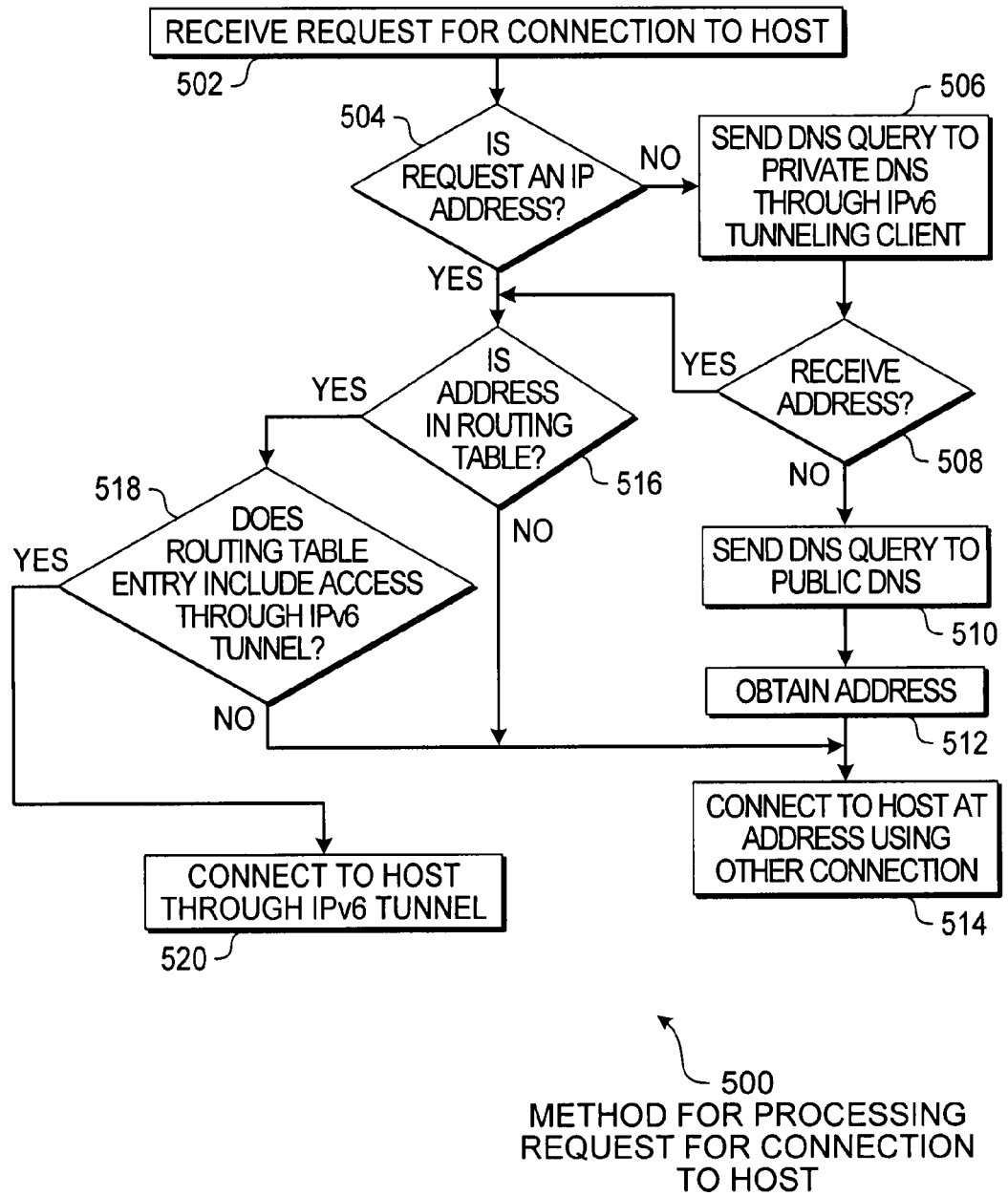
FIG. 5 is a flowchart illustration of an embodiment showing a method for processing a request for a connection to a host using IPv6 tunneling in some cases.

FIG. 5 is a flowchart illustration of a method for processing a request for a connection to a host. Embodiment 500 is a simplified example of one set of logic that may be used to connect a client to a host using an IPv6 tunneling connection. Other embodiments may use different terminology or nomenclature and may include additional steps or may combine two or more steps into a single step. In other embodiments, some steps illustrated as serial may be performed in parallel and vice versa.

Embodiment 500 is an example of a process by which a connection engine or a client device with an IPv6 tunneling client may process an incoming request for connection. Embodiment 500 may be performed after an IPv6 tunneling connection exists between a client and an IPv6 tunneling router located on the edge of a private network.

The request for connection to a host may be received in block 502. If the request is not an IP address but a hostname in block 504, a DNS query is made to a DNS server within the private network in block 506. If an address is not received from the private DNS server in block 508, a DNS query may be made to a public DNS server in block 510. An address may be received in block 512 and a connection may be made to the requested host in block 514 through a different connection than the IPv6 tunneling connection to the private network. A different connection may include a connection through the IPv4 or IPv6 Internet and may be considered the default connection after the IPv6 tunneling connection.

If the request from block 502 is an IP address in block 504 and the address is not in the routing table of block 516, a connection is made to the host through a different connection than the IPv6 tunneling connection.

If the request is an address in the routing table in block 516, and the routing table entry does not include access through the IPv6 tunnel in block 518, a connection is made to the host through the default connection in block 514.

If the request is an address in the routing table that does include access through the IPv6 tunnel in block 518, a connection is made to the host through the IPv6 tunnel in block 520.

If the private DNS query in block 506 returns an address in block 508, the process may continue with block 516. In many cases, a private DNS server may contain hostname addresses for the hosts within the private network, and as such the routing table of block 516 may include a range of IPv6 addresses that are accessible through the IPv6 tunnel in block 518.

Embodiment 500 is one example of a logic, decision tree, or sequence that may be applied to handle incoming requests for connections to a host and determine which requests may be handled through a default connection to the Internet in block 514 or through an IPv6 tunneling connection in block 520. Other embodiments may use similar or different logic, sequences, or functions.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method implemented on a client device having a processor and a memory, the method, comprising:
    establishing a first connection with an IPv6 tunneling server;
    authenticating the client device with the IPv6 tunneling server and the IPv6 tunneling server with the client device;
    obtaining an IPv6 address of an IPv6 router from the IPv6 tunneling server, the IPv6 router located on a gateway to a private network, the private network including one or more hosts;
    establishing a second connection with the IPv6 router;
    authenticating the client device with the IPv6 router and the IPv6 router with the client device; and
    forming an IPv6 tunnel with the IPv6 tunneling router.

2. The method of claim 1, further comprising:
    prior to establishing the connection with the IPv6 tunneling server:
        configuring the client device with an address of the IPv6 tunneling server; and
        storing a plurality of IPv6 addresses of the one or more hosts on the private network.

3. The method of claim 1, further comprising:
    prior to establishing the connection with the IPv6 tunneling server:
        setting a priority policy, the priority policy indicating which IP address to use to establish a connection with the one or more hosts, the IP address selected from an IPv4 address or an IPv6 address.

4. The method of claim 1 wherein the first connection is established using one of an IPv4 address or an IPv6 address.

5. The method of claim 1, further comprising:
    receiving a request for a connection to a select host on the private network, the request including an address; and
    when the address in the request does not match one of the plurality of IPv6 addresses, connecting to the select host using a connection other than the IPv6 tunnel.

6. The method of claim 1, further comprising:
    receiving a request for a connection to a select host on the private network, the request including an address;
    when the address in the request is not an IP address, obtaining an IP address for the select host from a private DNS, the private DNS located on the private network.

7. The method of claim 1, further comprising:
    receiving a request for a connection to a select host on the private network, the request including an address;
    matching the address with one of the stored plurality of IPv6 addresses;
    using the IPv6 tunnel to establish a connection with the select host.

8. A computer-readable storage device, comprising instructions that when executed on a processor, cause the processor to perform acts, comprising:
    establishing a connection with an IPv6 tunneling server;
    authenticating the client device with the IPv6 tunneling server and the IPv6 tunneling server with the client device;
    obtaining an IPv6 address of an IPv6 router from the IPv6 tunneling server, the IPv6 router located on a gateway to a private network, the private network including one or more hosts;
    establishing a second connection with the IPv6 router;
    authenticating the client device with the IPv6 router and the IPv6 router with the client device; and
    forming an IPv6 tunnel with the IPv6 tunneling router.

9. The computer-readable storage device of claim 8, comprising further instructions that when executed on a processor, cause the processor to perform acts, comprising:
    prior to establishing the connection with the IPv6 tunneling server:
        configuring the client device with an address of the IPv6 tunneling server; and
        storing a plurality of IPv6 addresses of the one or more hosts on the private network.

10. The computer-readable storage device of claim 8, comprising further instructions that when executed on a processor, cause the processor to perform acts, comprising:
    prior to establishing the connection with the IPv6 tunneling server:
        setting a priority policy, the priority policy indicating which IP address to use to establish a connection with the one or more hosts, the IP address selected from an IPv4 address or an IPv6 address.

11. The computer-readable storage device of claim 8 wherein the connection is established using one of an IPv4 address or an IPv6 address.

12. The computer-readable storage device of claim 8, comprising further instructions that when executed on a processor, cause the processor to perform acts, comprising:
    receiving a request for a connection to a select host on the private network, the request including an address; and
    when the address in the request does not match one of the plurality of IPv6 addresses, connecting to the select host using a connection other than the IPv6 tunnel.

13. The computer-readable storage device of claim 8, comprising further instructions that when executed on a processor, cause the processor to perform acts, comprising:
    receiving a request for a connection to a select host on the private network, the request including an address; and
    when the address in the request is not an IP address, obtaining an IP address for the select host from a private DNS, the private DNS located on the private network.

14. The computer-readable storage device of claim 8, comprising further instructions that when executed on a processor, cause the processor to perform acts, comprising:
    receiving a request for a connection to a select host on the private network, the request including an address;
    matching the address with one of the stored plurality of IPv6 addresses;
    using the IPv6 tunnel to establish a connection with the select host.

15. A system comprising the following computer-executable components:
    an IPv6 tunneling client that:
        establishes a connection with an IPv6 tunneling server,
        authenticates a client device with the IPv6 tunneling server and the IPv6 tunneling server with the client device,
        obtains an IPv6 address of an IPv6 router from the IPv6 tunneling server, the IPv6 router located on a gateway to a private network, the private network including one or more hosts,
        establishes a second connection with the IPv6 router,
        authenticates the client device with the IPv6 router and the IPv6 router with the client device, and
        forms an IPv6 tunnel with the IPv6 tunneling router; and a connection engine that accepts a connection request and uses the IPv6 tunneling client to facilitate the requested connection.

16. The system of claim 15, wherein the IPv6 tunneling client is configured with an address of the IPv6 tunneling server and a plurality of IPv6 addresses of the one or more hosts on the private network.

17. The system of claim 15, wherein the IPv6 tunneling client is configured with a priority policy, the priority policy indicating which IP address to use to establish a connection with the one or more of the hosts, the IP address selected from an IPv4 address or an IPv6 address.

18. The system of claim 15, wherein the connection engine receives a request for a connection to a select host on the private network, the request including an address and when the address in the request does not match one of the plurality of IPv6 addresses, connects to the select host using a connection other than the IPv6 tunnel.

19. The system of claim 15, wherein the connection engine receives a request for a connection to a select host on the private network, the request including an address and when the address in the request is not an IP address, obtains an IP address for the select host from a private DNS, the private DNS located in the private network.

20. The system of claim 15, wherein the connection engine receives a request for a connection to a select host on the private network, the request including an address, matches the address with one of the stored plurality of IPv6 addresses, and uses the IPv6 tunnel to establish a connection with the select host.

* * * * *